(12) United States Patent
Jenart et al.

(10) Patent No.: US 10,960,904 B2
(45) Date of Patent: Mar. 30, 2021

(54) RAILCAR ADAPTER FOR CONNECTING A RAILCAR BODY TO A BEARING

(71) Applicant: Aktiebolaget SKF, Gothenburg (SE)

(72) Inventors: Gautier Jenart, Saint Herblain (FR); Ludovic Fenayon, Montbazon (FR); Thierry Le Moigne, Luynes (FR)

(73) Assignee: Aktiebolaget SKF, Gothenburg (SE)

( * ) Notice: Subject to any disclaimer, the term of this patent is extended or adjusted under 35 U.S.C. 154(b) by 320 days.

(21) Appl. No.: 15/994,070

(22) Filed: May 31, 2018

(65) Prior Publication Data

US 2019/0367055 A1 Dec. 5, 2019

(51) Int. Cl.
| | |
|---|---|
| *B61F 15/06* | (2006.01) |
| *B61F 15/12* | (2006.01) |
| *B61F 15/22* | (2006.01) |
| *B61F 5/26* | (2006.01) |

(52) U.S. Cl.
CPC ............... *B61F 15/06* (2013.01); *B61F 5/26* (2013.01); *B61F 15/12* (2013.01); *B61F 15/22* (2013.01); *F16C 2326/10* (2013.01)

(58) Field of Classification Search
CPC .......... B61F 15/00; B61F 15/02; B61F 15/06; B61F 15/12; B61F 15/20; B61F 15/22; B61F 15/26; B61F 15/32; B61F 5/26
See application file for complete search history.

(56) References Cited

U.S. PATENT DOCUMENTS

| | | | | |
|---|---|---|---|---|
| 3,272,573 A | * | 9/1966 | Smith ..................... | B61F 17/08 384/174 |
| 4,687,211 A | | 8/1987 | Bessone .................. | B61F 15/24 277/421 |
| 5,237,933 A | | 8/1993 | Bucksbee .............. | B61F 5/305 105/224.1 |
| 5,794,538 A | * | 8/1998 | Pitchford ................. | B61F 5/32 105/218.1 |
| 5,799,582 A | * | 9/1998 | Rudibaugh .............. | B61F 5/32 105/222 |
| 7,143,700 B2 | | 12/2006 | Forbes ..................... | B61F 5/14 105/223 |
| 7,775,163 B2 | * | 8/2010 | Forbes .................... | B61F 5/122 105/224.1 |
| 7,966,946 B1 | * | 6/2011 | Novak ..................... | B61F 5/32 105/218.1 |
| 8,272,333 B2 | | 9/2012 | Forbes ................... | B61F 15/08 105/223 |
| 8,893,626 B2 | * | 11/2014 | Berg ........................ | B61F 5/32 105/220 |

(Continued)

FOREIGN PATENT DOCUMENTS

| | | |
|---|---|---|
| DE | 20200198667 A1 | 6/2020 |
| FR | 20170137042 A1 | 5/2017 |
| FR | 20190367052 A1 | 12/2019 |

*Primary Examiner* — Jason C Smith
(74) *Attorney, Agent, or Firm* — Garcia-Zamor Intellectual Property Law; Ruy Garcia-Zamor; Bryan Peckjian

(57) ABSTRACT

A railcar adapter for radially connecting a railcar body to a bearing. The railcar adapter includes two lateral channels each delimited by a pair of opposed lugs and a lateral guiding surface perpendicular to the opposed lugs, lateral channels being adapted to cooperate with the railcar body. The lateral guiding surfaces of lateral channels, in cross-section through a plane perpendicular to the axis of rotation of bearing, are curved.

24 Claims, 2 Drawing Sheets

(56) References Cited

U.S. PATENT DOCUMENTS

| | | | |
|---|---|---|---|
| 9,434,393 B2 | 9/2016 | Gotlund | B61F 5/125 |
| 10,384,695 B2 | 8/2019 | Fenayon | B61F 15/20 |
| 10,399,578 B2 | 9/2019 | Fenayon | B61F 15/06 |
| 10,576,999 B2 | 3/2020 | Fenayon | B61F 15/12 |
| 10,727,718 B2 | 7/2020 | McGoogan | H02K 7/04 |
| 2014/0318412 A1* | 10/2014 | East | B61F 5/28 |
| | | | 105/218.1 |
| 2015/0183442 A1* | 7/2015 | Gotlund | B61F 5/26 |
| | | | 105/224.05 |
| 2017/0129510 A1 | 5/2017 | Golembiewski | |
| 2017/0137040 A1* | 5/2017 | Fenayon | B61F 15/06 |
| 2017/0137041 A1* | 5/2017 | Fenayon | B61F 15/12 |
| 2017/0137042 A1 | 5/2017 | Fenayon | B61F 15/20 |
| 2019/0367052 A1 | 12/2019 | Jenart | B61F 15/12 |
| 2019/0367053 A1* | 12/2019 | Jenart | B61F 15/22 |
| 2019/0367054 A1* | 12/2019 | Jenart | B61F 15/12 |
| 2019/0367055 A1* | 12/2019 | Jenart | B61F 15/12 |
| 2019/0367056 A1* | 12/2019 | Jenart | B61F 15/06 |
| 2020/0198667 A1 | 6/2020 | Zeitler | B61F 15/26 |

\* cited by examiner

RAILCAR ADAPTER FOR CONNECTING A RAILCAR BODY TO A BEARING

TECHNOLOGICAL FIELD

The present invention relates to the field of bearing adapters for a railcar.

BACKGROUND

A railcar generally comprises a bogie frame provided with a pair of side frames on each side having downwardly opening jaws. A bearing adapter is vertically moveable within the jaws and rests on a bearing mounted on a railcar axle carrying a wheel of the railcar. The bearing adapter is thus a rigid connection between the bogie frame of the railcar and the bearing. Typically, a bearing for a railcar axle fits around a journal at the end of the railcar axle where it is mounted between a backing ring assembly and an end cap.

However, the railcar adapter may move with respect to the bearing. The railcar adapter may be misaligned with respect to the bearing when the railcar runs over curved rail tracks. This results in unexpected wear of some parts, in particular lugs of lateral channels engaging a lug of a jaw of the bogie frame, and then reduce their service life.

The load applied by the bogie frame through the adapter may not be well distributed on the bearing, notably on the rolling elements when the bearing is of the rolling bearing type. This results in wear on the inner surface and the outer surface of the railcar adapter, as well as in failure of the bearing.

These and other problems are addressed by embodiments of the present invention.

SUMMARY

To this end, the invention relates to a railcar adapter for radially connecting a railcar body to a bearing. The railcar adapter comprises two lateral channels each delimited by a pair of opposed lugs and a lateral guiding surface perpendicular to the opposed lugs. Lateral channels are adapted to cooperate with the railcar body. The railcar adapter comprises two frontal flanges that inwardly protrude with respect to the inner surface, and that delimit with the inner surface a housing for the bearing. The railcar adapter comprises an inner surface acting as a bearing seat for the bearing. The railcar adapter comprises an outer surface that is adapted to be in direct radial contact with the railcar body.

According to the invention, the lateral guiding surfaces of lateral channels, in cross-section through a plane perpendicular to the axis of rotation of bearing, are curved.

Such arrangement improves the service life of the railcar adapter and the bearing by reducing wear. The curved outer lateral guiding surfaces of railcar adapter compensate the relative misalignment between the railcar body and the bearing. The load applied by the bogie frame through the adapter is uniformly distributed on the bearing, notably on the rolling elements when the bearing is of the rolling bearing type.

Such arrangement improves the service life of the railcar adapter and the bearing by preventing relative misalignment and wear.

According to further aspects of the invention which are advantageous but not compulsory, such a railcar adapter may incorporate one or several of the following features:

The inner surface has, for example, a concave shape of constant radius so as to sit on the bearing.

The outer surface of railcar adapter, in cross-section through the axis of rotation of bearing, is curved.

The outer surface of railcar adapter is cylindrical or spherical.

The outer surface of railcar adapter is flat.

The lateral guiding surfaces of lateral channels are cylindrical.

The lateral guiding surfaces of lateral channels are spherical.

The railcar adapter is made from metal, for example, by casting. For example, the railcar adapter is made from cast steel or cast iron.

According to another aspect, the invention relates to a railcar adapter assembly comprising a railcar adapter according to any of the preceding embodiments, a bearing mounted inside the railcar adapter, a backing ring adapted to come into axial contact with the bearing at a first side, and an end cap assembly adapted to come into axial contact with the bearing at another side, opposite to the first side.

In one embodiment, the bearing comprises at least one inner ring and at least one outer ring mounted in radial contact with the inner surface of the railcar adapter.

In one embodiment, the bearing comprises at least one row of rolling elements, arranged between raceways provided on the inner and outer rings.

In one embodiment, the inner ring of the bearing is made in two parts, axially separated by an axial spacer.

According to another aspect, the invention relates to railcar axle comprising a railcar adapter assembly according to any of the preceding embodiments, a shaft being rotatably mounted about an axis of rotation relative to a railcar adapter, inside the bearing. The shaft comprises a first end mounted radially inside the backing ring and a second end, opposite to the first end, secured to the end cap assembly.

BRIEF DESCRIPTION OF THE DRAWINGS

Other advantages and features of the invention will emerge upon examining the detailed description of embodiments, which are in no way limiting, and the appended drawings wherein.

DETAILED DESCRIPTION

Figure 1:
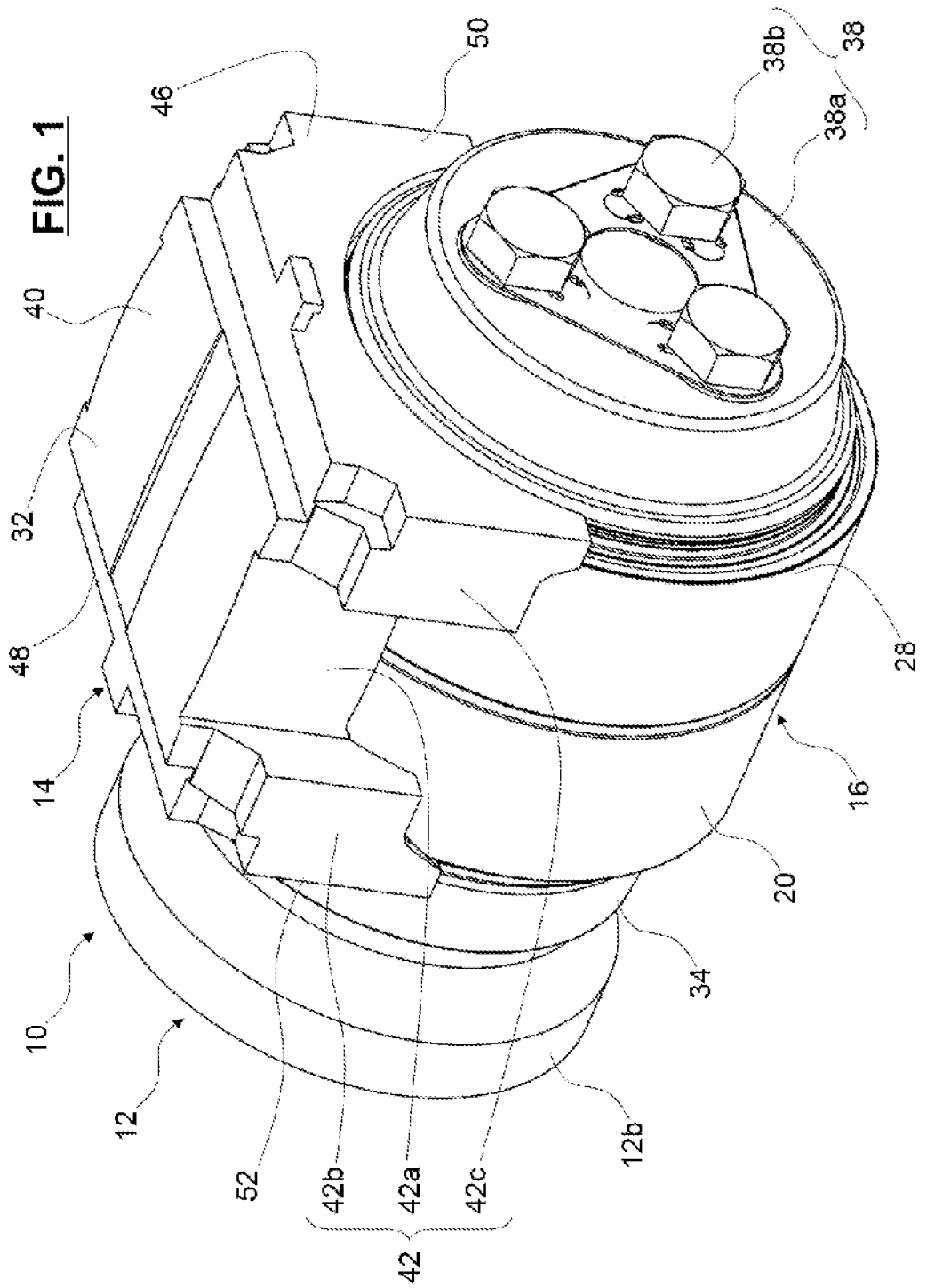
FIG. 1 is a perspective view of a railcar axle according to the invention.
Figure 2:
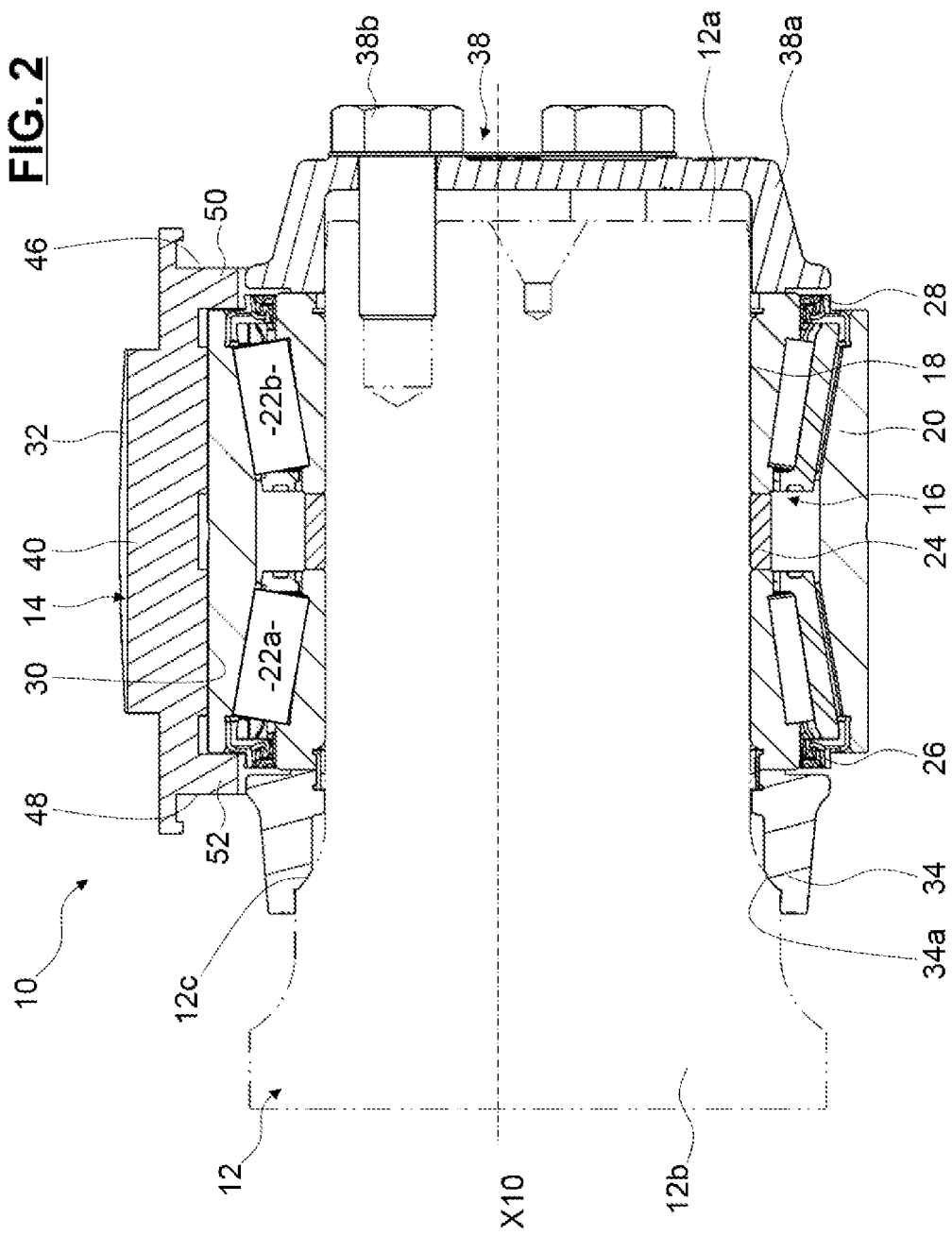
FIG. 2 is an axial cross-section of the railcar axle of FIG. 1.

Referring to FIGS. 1 and 2, a railcar axle 10 is provided for binding the bogie frame of a railcar to the wheels (not shown). The railcar axle 10 comprises a shaft 12 (in dotted lines in FIG. 2), being rotatably mounted about an axis of rotation X10 relative to a railcar adapter 14. The railcar adapter 14 is secured to the railcar bogie frame, the shaft 12 being secured to the wheels.

A bearing 16 is radially provided between the railcar adapter 14 and the shaft 12. As illustrated in FIG. 2, the bearing 16 is of the rolling bearing type, and comprises an inner ring 18 mounted on the shaft 12, an outer ring 20 mounted inside the railcar adapter 14 and two rows of rolling elements 22a, 22b, for example rollers, arranged between raceways provided on the inner and outer rings 18, 20. The inner ring 18 is, for example, made in two parts, axially separated by an axial spacer 24. In this embodiment, the bearing 16 is a tapered rollers bearing.

The bearing 16 is further provided with sealing means 26, 28 on both axial ends. Sealing means 26, 28 close a radial space defined between the inner ring 18 and the outer ring 20. The rolling elements 22a, 22b are arranged in the sealed radial space.

The railcar adapter 14 is secured to the outer ring 20 by its radially inward side or bearing seat side 30 and is mounted inside the bogie frame by its radially outward side or frame seat side 32.

The shaft 12 comprises a journal 12a and a dust guard having a cylindrical surface 12b whose diameter is bigger than the diameter of the journal 12a. A concave fillet 12c connects the cylindrical surface 12b on the journal 12a. The inner ring 18 of the bearing is mounted on the journal 12a.

As illustrated, the railcar axle 10 further comprises a backing ring 34 having an inner surface 34a adapted to radially come into contact with the outer surface of the shaft 12, at the fillet 12c side and to axially come into contact with the inner ring 18 of the bearing 16.

Accordingly, the inner surface 34a of backing ring 34 has a rounded shape, almost complementary to that of the fillet 12c.

The railcar axle 10 also comprises an end cap assembly 38. The end cap assembly 38 includes an end cap 38a provided for being a stop element in case of a leftward translation (relative to FIG. 2) of the shaft 12 relative to the inner ring 18. Therefore, the end cap 38a is reliably secured to the journal 12 by means of three cap screws 38b and comes in axial contact with the inner ring 18 of the bearing 16.

As illustrated in detail on FIG. 1, the railcar adapter 14 comprises an adapter body 40 provided with two lateral channels 42. In the FIG. 1, only one channel 42 is illustrated, the adapter body 40 comprising another lateral channel on the opposite lateral side. Each of the lateral channels 42 is axially delimited by a pair of opposed lugs 42b, 42c and a lateral guiding surface 42a perpendicular to the lugs. Each lateral channel 42 has a U-shape and is adapted to engage with a lug of a jaw (not shown) of the bogie frame, so as to act as an insertion guide between the adapter and the bogie frame.

The body 40 of the railcar adapter 14 further comprises two frontal surfaces 46, 48, the inner surface 30 acting as a bearing seat in radial contact with the outer ring 20 of the bearing 16, and the outer surface 32 acting as a frame seat in radial contact with the bogie frame.

The inner surface 30 has a concave shape of constant radius so as to sit on the outer cylindrical surface of the outer ring 20 of the bearing 16.

The frontal surfaces 46, 48 are provided with a first and a second frontal flanges 50, 52, respectively, directed radially inwards. The flanges 50, 52 radially inwardly protrude with respect to the inner surface 30. The flanges 50, 52 are axially opposite one each other. The flanges 50, 52 delimit with the inner surface 30 a housing for the outer ring 20 of bearing 16. The outer ring 20 is axially arranged between the flanges 50, 52.

The adapter body 40 is made from metal by any suitable process, such as, for example, by casting. For example, the body 40 is made from steel or cast iron.

According to the invention, the lateral guiding surfaces 42a of lateral channels are curved, in cross-section through a perpendicular plane to the axis of rotation X10 of the bearing 16. In the illustrated embodiment, the lateral guiding surfaces 42a are cylindrical. Alternatively, the lateral guiding surfaces 42a may be spherical.

The bogie frame comprises lugs of jaws engaged within the lateral channels 42 of railcar adapter 14, and in abutment against the lateral guiding surfaces 42a. In case of relative misalignment between the bogie frame and the bearing 16, the bogie frame can swivel onto the curved lateral guiding surfaces 42a. The misalignment is then compensated. The railcar adapter 14 is prevented from any displacement with respect to the bearing 16.

Advantageously, the outer surface 32 of railcar adapter 14 is also curved. In the illustrated embodiment, the outer surface 32, in cross-section through the axis of rotation X10 of bearing 16, is cylindrical. Alternatively, the outer surface 32 may be spherical.

The bogie frame comprises a lower surface in radial abutment against the outer surface 32 of railcar adapter 14. In case of relative misalignment between the bogie frame and the bearing 16, the bogie frame can also swivel onto the curved outer surface 32. The railcar adapter 14 comprises curved contact surfaces 42a, 32 with the bogie frame along two directions.

As an alternate (not illustrated), the inner surfaces of the opposed lugs 42b, 42c of lateral channels 42, in cross-section through a plane perpendicular to the axis of rotation X10 of bearing 16, are curved. For example, the surfaces may be cylindrical or spherical.

It should be noted that the embodiments, illustrated and described were given merely by way of non-limiting indicative examples and that modifications, combinations and variations are possible within the scope of the invention.

The invention has been illustrated on the basis of a rolling bearing provided with at least one row of rolling elements radially disposed between the inner and outer rings. Alternatively, the bearing may be a plain bearing or a sliding bearing comprising one or two rings.

What is claimed is:

1. A railcar adapter for radially connecting a railcar body to a bearing, and comprising: two lateral channels each delimited by a pair of opposed lugs and a lateral guiding surface perpendicular to the pair of opposed lugs, each of the two lateral channels being adapted to cooperate with the railcar body, wherein the lateral guiding surface has a top edge, a bottom edge, and first and second lateral edges, two frontal flanges that inwardly protrude with respect to the inner surface, and that delimit with the inner surface a housing for the bearing, an inner surface acting as a bearing seat for the bearing, and an outer surface adapted to be in direct radial contact with the railcar body, wherein the top edge of the lateral guiding surface is located on the outer surface, the bottom edge of the lateral guiding surface is located on the bearing, and the first and second lateral edges are each located at a separate one of the pair of opposed lugs, wherein the outer surface, in cross-section through the axis of rotation of bearing, is curved, and wherein the lateral guiding surface of each of the two lateral channels, when viewed in cross-section through a plane parallel to the axis of rotation of bearing, is curved at all points between the top edge and the bottom edge.

2. The railcar adapter according to the claim 1, wherein the lateral guiding surface is cylindrical.

3. The railcar adapter according to the claim 1, wherein the lateral guiding surface is spherical.

4. A railcar adapter for radially connecting a railcar body to a bearing, and comprising:
   two lateral channels each delimited by a pair of opposed lugs and a lateral guiding surface perpendicular to the pair of opposed lugs, each of the two lateral channels being adapted to cooperate with the railcar body, wherein the lateral guiding surface has a top edge, a bottom edge, and first and second lateral edges, two frontal flanges that inwardly protrude with respect to the inner surface, and that delimit with the inner surface a housing for the bearing, an inner surface acting as a bearing seat for the bearing, and an outer surface adapted to be in direct radial contact with the railcar body, wherein the top edge of the lateral guiding surface is located on the outer surface, the bottom edge of the lateral guiding surface is located on the bearing, and the first and second lateral edges are each located at a separate one of the pair of opposed lugs, wherein the outer surface, in cross-section through the axis of rotation of bearing, is curved, and wherein the lateral guiding surface of each of the two lateral channels, when viewed in cross-section through a plane parallel to the axis of rotation of bearing, is curved at all points between the top edge and the bottom edge.

5. The railcar adapter according to the claim 4, wherein the outer surface of railcar adapter is cylindrical.

6. The railcar adapter according to the claim 4, wherein the outer surface of railcar adapter is spherical.

7. A railcar adapter assembly comprising:
a railcar adapter,
a bearing mounted inside the railcar adapter,
a backing ring adapted to come into axial contact with the bearing at a first side, and
an end cap assembly adapted to come into axial contact with the bearing at another side, opposite to the first side, the railcar adapter comprising:
two lateral channels each delimited by a pair of opposed lugs and a lateral guiding surface perpendicular to the pair of opposed lugs, each of the two lateral channels being adapted to cooperate with the railcar body, wherein the lateral guiding surface has a top edge, a bottom edge, and first and second lateral edges,
two frontal flanges that inwardly protrude with respect to the inner surface, and that delimit with the inner surface a housing for the bearing,
an inner surface acting as a bearing seat for the bearing, and
an outer surface adapted to be in direct radial contact with the railcar body, wherein the top edge of the lateral guiding surface is located on the outer surface, the bottom edge of the lateral guiding surface is located on the bearing, and the first and second lateral edges are each located at a separate one of the pair of opposed lugs,
wherein the lateral guiding surface, when viewed in cross-section through a plane perpendicular to the axis of rotation of bearing, is curved such the lateral guiding surface is smooth between the top edge, the bottom edge, and the first and second lateral edges.

8. The railcar adapter according to the claim 7, wherein the lateral guiding surface is cylindrical.

9. The railcar adapter according to the claim 7, wherein the lateral guiding surface is spherical.

10. The railcar adapter assembly according to the claim 7, wherein the bearing comprises at least one inner ring and at least one outer ring mounted in radial contact with the inner surface of the railcar adapter.

11. The railcar adapter assembly according to the claim 7, wherein the bearing comprises at least one row of rolling elements, arranged between raceways provided on the inner and outer rings.

12. The railcar adapter assembly according to the claim 7, wherein the inner ring of the bearing is made in two parts, axially separated by an axial spacer.

13. A railcar adapter assembly comprising: a railcar adapter, a bearing mounted inside the railcar adapter, a backing ring adapted to come into axial contact with the bearing at a first side, and an end cap assembly adapted to come into axial contact with the bearing at another side, opposite to the first side, the railcar adapter comprising: two lateral channels each delimited by a pair of opposed lugs and a lateral guiding surface perpendicular to the pair of opposed lugs, each of the two lateral channels being adapted to cooperate with the railcar body, wherein the lateral guiding surface has a top edge, a bottom edge, and first and second lateral edges, two frontal flanges that inwardly protrude with respect to the inner surface, and that delimit with the inner surface a housing for the bearing, an inner surface acting as a bearing seat for the bearing, and an outer surface adapted to be indirect radial contact with the railcar body, wherein the top edge of the lateral guiding surface is located on the outer surface, the bottom edge of the lateral guiding surface is located on the bearing, and the first and second lateral edges are each located at a separate one of the pair of opposed lugs, wherein the outer surface, in cross-section through the axis of rotation of bearing, is curved, and wherein the lateral guiding surface of each of the two lateral channels, when viewed in cross-section through a plane parallel to the axis of rotation of bearing, is curved at all points between the top edge and the bottom edge.

14. The railcar adapter according to the claim 13, wherein the outer surface of railcar adapter is cylindrical.

15. The railcar adapter according to the claim 13, wherein the outer surface of railcar adapter is spherical.

16. The railcar adapter assembly according to the claim 13, wherein the bearing comprises at least one inner ring and at least one outer ring mounted in radial contact with the inner surface of the railcar adapter.

17. The railcar adapter assembly according to the claim 13, wherein the bearing comprises at least one row of rolling elements, arranged between raceways provided on the inner and outer rings.

18. The railcar adapter assembly according to the claim 13, wherein the inner ring of the bearing is made in two parts, axially separated by an axial spacer.

19. A railcar axle comprising:
a railcar adapter assembly including a bearing mounted inside the railcar adapter,
a backing ring adapted to come into axial contact with the bearing at a first side, and
an end cap assembly adapted to come into axial contact with the bearing at another side, opposite to the first side,
a shaft being rotatably mounted about an axis of rotation relative to a railcar adapter, inside the bearing, the shaft comprising a first end mounted radially inside the backing ring and a second end, opposite to the first end, secured to the end cap assembly, the railcar adapter comprising:
two lateral channels each delimited by a pair of opposed lugs and a lateral guiding surface perpendicular to the pair of opposed lugs, each of the two lateral channels being adapted to cooperate with the railcar body, wherein the lateral guiding surface has a top edge, a bottom edge, and first and second lateral edges,
two frontal flanges that inwardly protrude with respect to the inner surface, and that delimit with the inner surface a housing for the bearing, an inner surface acting as a bearing seat for the bearing, and an outer surface adapted to be in direct radial contact with the railcar body, wherein the top edge of the lateral guiding surface is located on the outer surface, the bottom edge of the lateral guiding surface is located on the bearing, and the first and second lateral edges are each located at a separate one of the pair of opposed lugs, wherein the lateral guiding surface of each of the two lateral channels, when viewed in cross-section through a plane parallel to the axis of rotation of bearing, is curved at all pints between the top edge and the bottom edge.

20. The railcar adapter according to the claim 19, wherein the lateral guiding surface is cylindrical.

21. The railcar adapter according to the claim 19, wherein the lateral guiding surface is spherical.

22. A railcar axle comprising:

a railcar adapter assembly including a bearing mounted inside the railcar adapter, a backing ring adapted to come into axial contact with the bearing at a first side, and an end cap assembly adapted to come into axial contact with the bearing at another side, opposite to the first side, a shaft being rotatably mounted about an axis of rotation relative to a railcar adapter, inside the bearing, the shaft comprising a first end mounted radially inside the backing ring and a second end, opposite to the first end, secured to the end cap assembly, the railcar adapter comprising:

two lateral channels each delimited by a pair of opposed lugs and a lateral guiding surface perpendicular to the pair of opposed lugs, each of the two lateral channels being adapted to cooperate with the railcar body, wherein the lateral guiding surface has a top edge, a bottom edge, and first and second lateral edges, two frontal flanges that inwardly protrude with respect to the inner surface, and that delimit with the inner surface a housing for the bearing, an inner surface acting as a bearing seat for the bearing, and an outer surface adapted to be in direct radial contact with the railcar body, wherein the top edge of the lateral guiding surface is located on the outer surface, the bottom edge of the lateral guiding surface is located on the bearing, and the first and second lateral edges are each located at a separate one of the pair of opposed lugs, wherein the outer surface, in cross-section through the axis of rotation of bearing, is curved, and wherein the lateral guiding surface, when viewed in cross-section through a plane perpendicular to the axis of rotation of bearing, is cured such the lateral guiding surface is smooth between the top edge, the bottom edge, and the first and second lateral edges.

23. The railcar adapter according to the claim 22, wherein the outer surface of railcar adapter is cylindrical.

24. The railcar adapter according to the claim 22, wherein the outer surface of railcar adapter is spherical.

* * * * *